United States Patent [19]

Lee et al.

[11] 4,054,755
[45] Oct. 18, 1977

[54] CONFERENCE CIRCUIT FOR PULSE CODED MODULATED TELEPHONY

[75] Inventors: David Quon Lee, Chicago; Donald W. McLaughlin, Naperville, both of Ill.

[73] Assignee: GTE Automatic Electric Laboratories Incorporated, Northlake, Ill.

[21] Appl. No.: 732,251

[22] Filed: Oct. 14, 1976

[51] Int. Cl.² ............................................. H04M 3/56
[52] U.S. Cl. ........................... 179/15 AT; 179/18 BC
[58] Field of Search ........... 179/15 AT, 18 BC, 1 CN

[56] References Cited

U.S. PATENT DOCUMENTS

| | | | |
|---|---|---|---|
| 3,699,264 | 10/1972 | Pitroda | 179/18 BC |
| 3,748,394 | 7/1973 | Thomas | 179/18 BC |
| 4,007,338 | 2/1977 | McLaughlin | 179/18 BC |
| 4,022,981 | 5/1977 | McLaughlin | 179/18 BC |

Primary Examiner—David L. Stewart
Attorney, Agent, or Firm—Robert J. Black

[57] ABSTRACT

A method of providing a multi-port conference circuit for use in a telephone switching system employing pulse coded modulated signals for transmission and supervision. Samplings of coded information are employed as a source of conference data and comparison with the digital information contained therein is employed to choose the speaker in a conference group. Included circuitry provides compensation for degradation caused by speech clipping and noise.

5 Claims, 3 Drawing Figures

CONFERENCE CIRCUIT

TIMING CHART

CONFERENCE CIRCUIT

CONFERENCE CIRCUIT FOR PULSE CODED MODULATED TELEPHONY

BACKGROUND OF THE INVENTION

1. Field of the Invention

This invention relates generally to transmission and switching techniques in telephone communication systems and more particularly to an improved conference technique whereby a number of channels in a telephone switching system employing pulse code modulation for transmission purposes are combined so that a number of subscribers may participate in a common telephone conversation.

The present invention pertains to a conference circuit for use in a private automatic branch exchange similar to those units manufactured by GTE Automatic Electric Incorporated and designated GTD 120. Circuitry with minimum modification could also be employed in Class 5 central offices that employ digital switching. Such telephone systems employ a time switching network rather than the more prevalent earlier space divided switching network.

In time division switching networks a requirement exists to have sources of pulse code modulated voice samples associated with time slots. These time slots allow the conference to sequentially receive the code for each conferee. For the conference circuit to be effective it must be able to recognize who the conferees are and of course who is not associated with the conference. The circuitry must also be capable of distributing the conference speaker's code to each conferee. Information of this sort is of course available in the telephone switching systems referred to above. It should be understood that only telephone switching systems employing pulse code modulation can use the circuitry of the present invention and such circuitry interfaces with time division portions of such switching networks.

2. Description of the Prior Art

An approach to the handling of pulse code modulated information in conference circuitry is taught by U.S. Pat. No. 3,699,264 which is assigned to the same Assignee as the present invention. In the noted patent digital signals are not converted to analog, rather binary words are compared from the participating channels, with the largest binary numbers selected as the speaker. The reference patent utilizes a maximum binary code to select the speaker. A co-pending U.S. application, Ser. No. 709,580, filed July 28, 1976 by the inventors of this application and now U.S. Pat. No. 4,022,981 issued May 10, 1977, utilizes a minimum binary code as employed in the coding formats (D2 and D3) currently employed in pulse code modulated telephony.

PCM conferencing as taught in the above-identified patent and co-pending application, requires a source of pulse code modulated (PCM) coded voice samples which have associated time slots. These time slots allow the conference to sequentially receive a code for each conferee. The conference circuitry must be able to recognize who the conferees are and who is not associated with the conference call. The conference circuit then determines the loudest PCM voice sample during each PCM time frame, storing and outputting the selected PCM code to all conferees. This technique however for generating conferencing is subject to degradation due to the presence of idle channel noise and from non-talking conferees as the speakers audio signal passes through the region and its PCM sample is at a low weight value.

In addition, when two or more conference members are conversing simultaneously the conference circuit could alternately select a new speaker for each time frame, thus severely clipping the speech of conversing conferees.

SUMMARY OF THE INVENTION

The present invention is intended to provide improvement in the conference circuit taught in the above referenced co-pending application, preventing speech clipping or the selection of noise in a conference circuit using the techniques taught in the co-pending application. The environment for operation of the switching system is like that taught in said application. In such a conference circuit PCM samples are taken for each conferee from the time switch and via comparator circuits a PCM sample is sent to the conferee. Since the selected PCM sample is not determined until all samples are compared, a frame delay is required after which all conferees except the selected conferee will receive the selected PCM sample from the previous frame. The selected conferee in turn receives a null code. To minimize speech clipping or selecting noise, two circuits, a preliminary and a preferred speaker preference circuit, are employed in the present invention.

The preliminary preference circuit utilize the identity of the previous selected speaker and after its PCM sample is compared, its binary way is modified to the highest value of a corresponding curve segment. This is done by adding a bit between the segment and step bits, allowing the binary value to be increased.

This technique permits the conference circuit to select the previous speaker if the incoming PCM samples are in the same PCM segment or below in value. This technique reduces the possibility for selecting noise as the selected speaker audio signal passes through the null region and its PCM sample is at a low weight value.

The preferred speaker preference circuit functions when the magnitude of a PCM sample exceeds the value of the preferred preference circuit threshold. When a speaker is selected for the suceeding frame and has a higher PCM sample than the threshold, the preferred preference circuit creates a higher binary weight, to the comparator, for the selected speaker for a period of one frame. This reduces speech clipping during that time when two or more conferees are conversing simultaneously.

Neither the preliminary or the preferred preference circuit alters the incoming or outgoing PCM sample to the conferees, additional binary weights are only presented to the comparison circuit to favor the previous speaker.

To permit synchronous operation with a network PCM time switch, timing circuits are generated within the conference circuit which are derived from the network clock.

The circuitry of the present invention is implemented using integrated circuits of conventional design.

BRIEF DESCRIPTION OF THE DRAWINGS

FIG. 1 comprises a diagram of the conference circuit; and

FIG. 2 a diagram of the related portion of a switching system network;

DESCRIPTION OF THE PREFERRED EMBODIMENT

Figure 1:
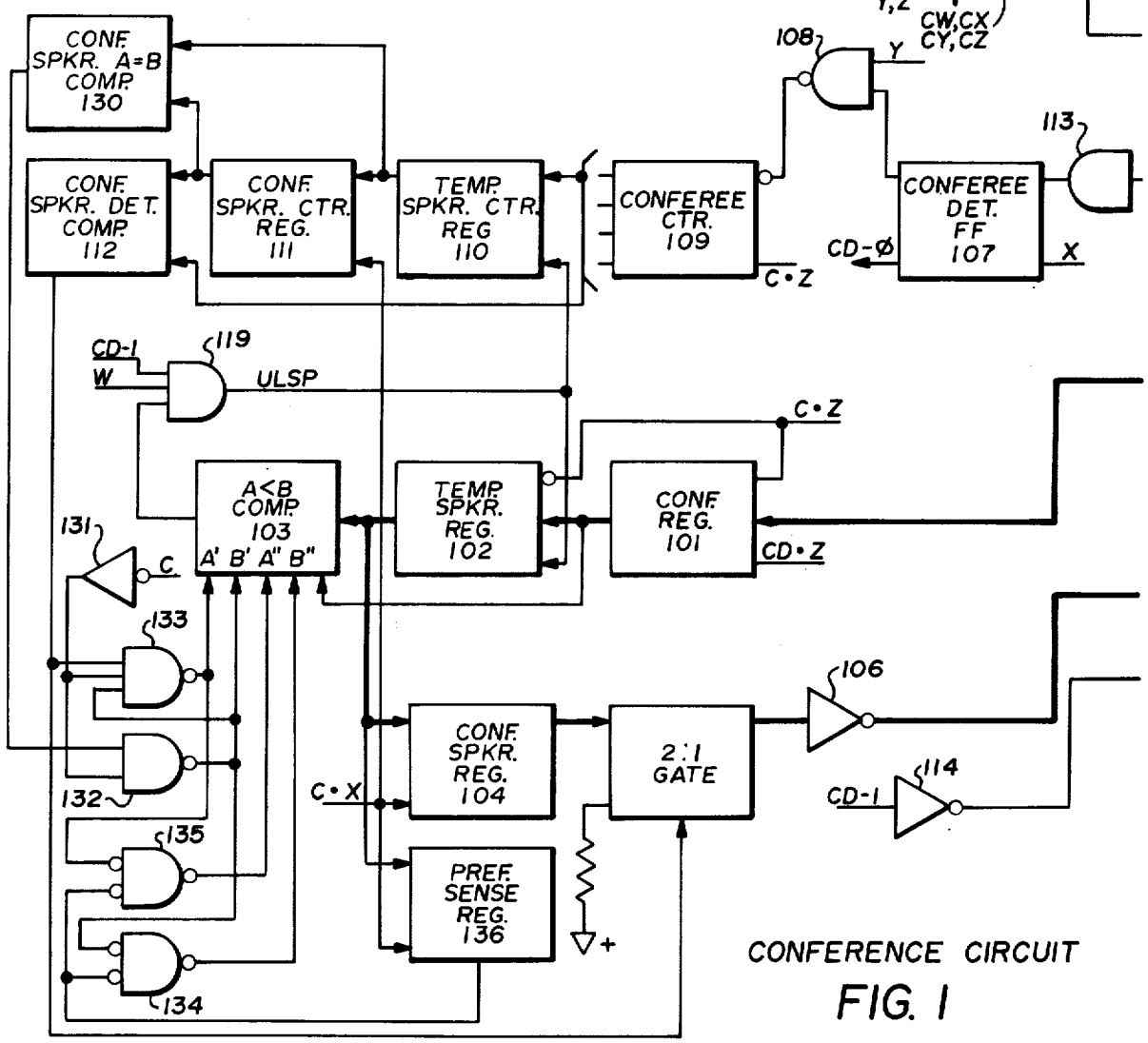
FIGS. 1 and 2 in combination with FIG. 1 placed to the left of FIG. 2 comprise a functional and logic diagram of a conference circuit connected to the switching network of a telephone system employing pulse code modulation.
Figure 2:
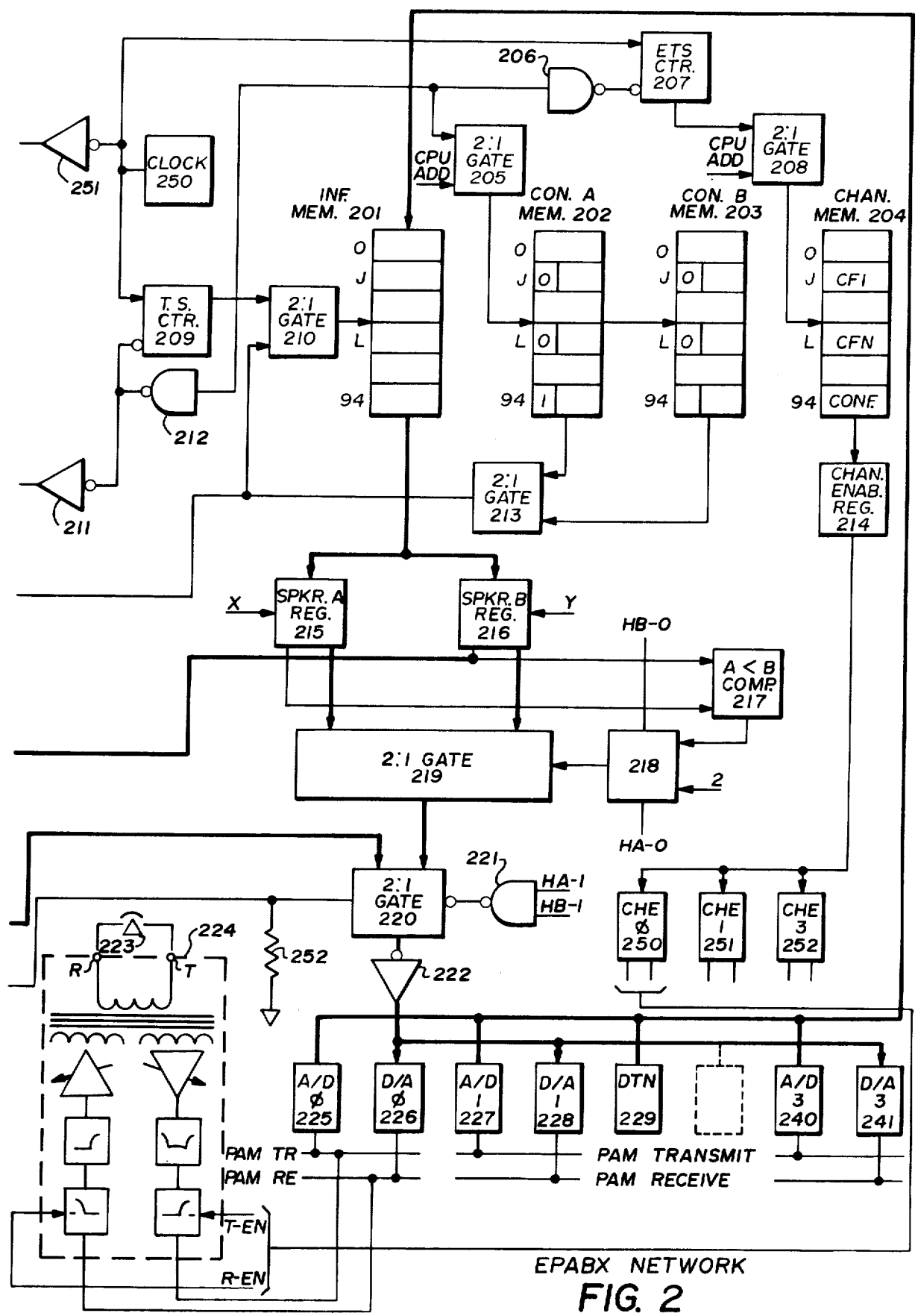

Implementation of the present invention is accomplished by means of circuitry arranged in logic configurations as shown in FIGS. 1 and 2. It should be noted that detailed circuit configurations of such circuitry have not been shown inasmuch as they do not form a portion of the present invention. It is well within the capability of those skilled in the art to implement the required functional circuitry based on the state of the art technology. Commercially available logic circuit is available to facilitate such implementation.

Referring now to FIG. 1 a conference circuit in accordance with the present invention is shown. The conference circuit includes a conference register 101 whose data input is connected to the Speaker B register of the connected telephone switching network, and which is clocked in response to CD-Z pulses and reset in response to C-Z pulses. The data output of this register is connected to the data input of Temporary Speaker register 102 which is also reset in response to C-Z pulses and strobed in response to an Update Loudest Speaker (ULSP) pulse. The data output of this register in turn is connected to the data input of Conference Speaker register 104 whose data output is gated through a 2:1 steering gate 105, the output from gate 105 being transmitted through inverter 106 as the conference PCM-$\phi$ signal to the switching network. Register 102 output is also connected to one of the inputs of comparator 103 whose other input is connected to the data output of register 101. Conference Speaker register 104 is strobed by C-X pulses. The output of comparator 103 is connected to gate 119 in combination with CD-1 and W inputs to form the Update Loudest Speaker signal.

A Conference Detected flip-flop 107 has its operate input connected to gate 113 which acts as a decoder for time slot 94 and the absence of the hold bit being on, to produce a CD-1 output which is gated through NAND gate 108 with a Y pulse to provide the input advance signal for Conferee counter 109. Counter 109 is reset in response to a C-X pulse. The output of counter 109 is stored in Temporary Speaker counter register 110 and after being transferred in response to a ULSP signal the information stored therein is passed to Conference Speaker counter register 111 which registers information from register 110 in response to C-X pulses. Outputs from Conference Speaker counter register 111 are compared to outputs from Conferee counter 109 which are connected to the B and A inputs respectively of comparator 112. When determination is made that the contents of the two registers are equal, it provides a Conference Speaker Detected signal (CSD) to 2:1 steering gate 105 and gate 133. Contents from register 110 and register 111 are connected to the A and B inputs respectively at comparator 130. When a determination is made that the contents of the two registers are equal, it provides "true" signal to gate 132. NAND gates 132 and 133 are enabled when invertor 131 outputs "true" signal.

When the inputs of NAND gate 132 are "true", it produces a "new speaker same" signal (NSS-$\phi$) to the B' input of Comparator 103. When the three inputs of gate 133 are "true" it outputs a "last speaker detected" signal (LASD-$\phi$) to the A' input of Comparator 103. Signals LASD-$\phi$ and NSS-$\phi$ are "false" signals, used to provide preliminary preference to Comparator 103. These two bits are placed between the segment and step bits of the PCM data at the comparator. If the selected PCM sample is located in the fourth or higher segment of the corresponding curve ("false" signal on bit 7 of PCM sample), a "false" signal will be present at the input of Preferred Sense register 136 being strobed to the output by signal C-X. The output signal "prefer enable" (PRFEN-0), NSS-$\phi$ and LASD-$\phi$ via gate 134 and 135 to the B" and A" inputs respectively of comparator 103. The "false" signal from gates 134 and 135 are used to provide the prefer preference to comparator 103. These two bits A" and B" are inserted between the fifth and sixth bits of the PCM data at comparator 103. Registers 101, 102 and 104 and gate 105 all handle a data stream which is 8 bits wide. Registers 110 and 111 and comparators 112 and 130 have a 4 bit wide data handling capability. Comparator 103 handles the 8 bit wide data stream, plus the two additional bits required for the "preliminary" and "prefer" preference signals.

Figure 3:
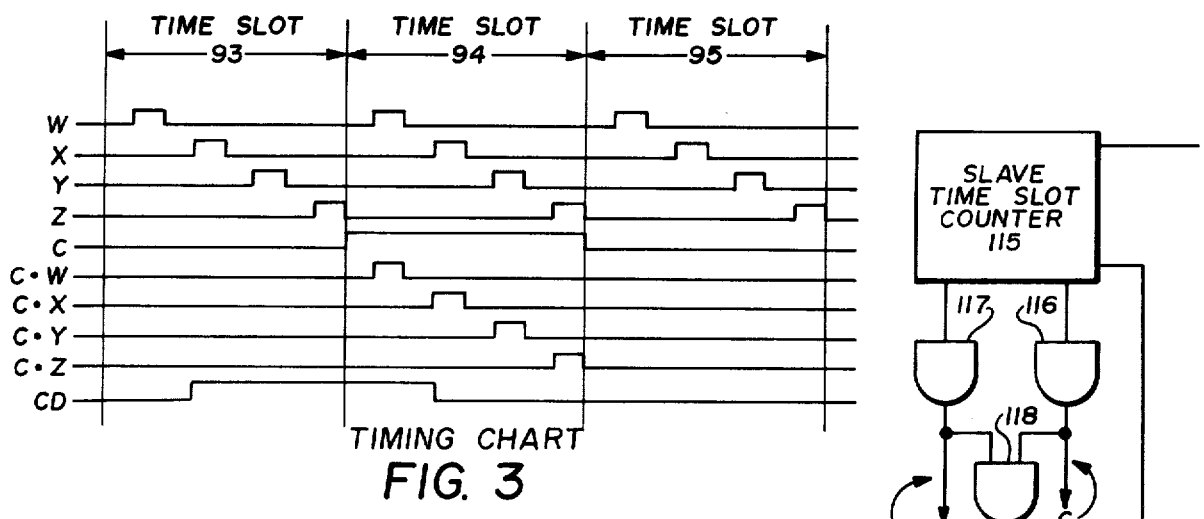
FIG. 3 is a timing chart showing the timing relationship between various pulses and signals employed in the operation of a conference circuit in accordance with the present invention.

Also included in the conference circuit of FIG. 1 is a Slave Time Slot counter 115 which receives input pulses (CK-$\phi$) from the connected switching network and which may be reset in response to Reset-1 pulses from the telephone switching network. Through a logic network including symbolic decoding AND gates 117, 118 and 116; pulses W, X, Y, Z, CW, CY, CZ and C are generated for advancing the logic circuitry of the conference circuit. The relationship of the pulses derived from the output of counter 115 are shown during time slots 93, 94 and 95 in the timing chart of FIG. 3. They result from the symbolic decoding AND gates which include logic to perform such decodes as anyone skilled in the art might choose.

Referring to FIG. 2 those portions of a switching network of a PABX employing pulse coded modulated transmission techniques and digital switching on a time division basis which interfaces with the conference circuit of the present invention is shown. Such circuitry includes an Information memory 201, a Control A memory 202, a Control B memory 203 and a Channel memory 204. Each memory has a capacity of 768 bits (8x96). Information stored in Information memory 201 is derived from PCM Out Bus-1 which has connections to analog to digital converters such as 225, 227 and 240 and also from digital tone circuitry 229. Control of memory 201 is from Clock source 250 which drives Time Slot counter 209 and inputs to 2:1 steering gate 210 and information gated through 2:1 steering gate 213 whose inputs are connected to Control A memory 202 and Control B memory 203 outputs. The output of steering gate 213 while inputting to steering gate 210 also is provided to the conference circuit. (FIG. 1). Information stored in memory 201 is distributed during X and Y pulses respectively to Speaker A register 215 and Speaker B register 216, both of which include outputs connected to the input of 2:1 steering gate 219.

Speaker B register 216 also has an output connected to the Speaker B PCM-1 bus extending to the conference circuit and to comparator 217. Speaker A register 215 also includes an output to comparator 217. The output of comparator 217 indicates when the information stored in Speaker A register 215 is less than (PAM signal is larger than) the information stored in Speaker B register 216; and is transmitted to register 218. Register 218 which is also controlled by HB-O and HA-O signals produces a Speaker B output signal which is used to control gate circuit 219 whose output is connected to 2:1 steering gate 220. Also connected to steering gate 220 is a Conference PCM-O bus from the conference circuit. Control of gate 220 is via the Force Conference-0 signal from the conference circuit and a "null"-$\phi$ signal from NAND gate 221 whose inputs are connected to the HA-1 and HB-1 signals. Outputs from gates 220 are connected to digital-to-analog circuits 226, 228 and 241. The Channel memory 204 is driven by an Early Time Slot counter 207 which is reset early by Decode gate 206 which decodes the Time Slot counter 209. The 2:1 steering gate 208 then drives the Channel memory to allow channel identities stored in it which includes conferee identities to be outputted to the Channel Enable register 214 and then to be distributed to Channel Enable circuits 250, 251 and 252. Pulse amplitude modulated transmission and receive busses provide connections between conference line circuits such as 224, which are gated by channel enable equipment (250) via leads TEN and REN.

Referring now to FIGS. 1 and 2 in combination, the operation being described assumes the switching network of FIG. 2 has been already set up by an associated central processor to allow for a conference of N conferees. The method by which the call has been established is not important and could result from such types of conference applications as progressive, meet me, or attendant (operator) conference. In systems as previously referenced, such determination is all software controlled and results in a network configuration as shown in FIG. 2. The conferees may be served by lines, trunks or might be a PBX attendant or operator.

In the network configuration shown, the conferees equipment identify is stored in the Channel memory 204. This location defines its associated time slot and allows signals stored in register 214 ahead of the channel enabling circuitry to generate, transmit enable (TEN) and receive enable (REN) pulses to a Conferee circuit such as 224. The Control A memory 202 of the same time slot (i.e., same memory word address of the Channel memory 204 word with the identity) has the hold bit "bit" and a time slot address of 94. This identifies this time slot as a conference member (conferee). The Control B memory then must have the hold bit also "off" and its own time slot address. For purposes of the present discussion this will be J for conferee 1 and L for conferee N in the memories of FIG. 2. This allows the Network Speaker B register 216 to contain the pulse code modulation information of each conferee during its own time slot.

At this time the circuitry is ready to provide a conference for N conferees. The heavy lines shown in FIGS. 1 and 2 show the flow of pulse code modulated signals indicative of voice signals over 8 bit parallel paths. All logic functions, registers, etc., included in the above noted path are also 8 bits wide.

Beginning now with the Slave Time Slot counter 115 at a count of 94 which is the conference time slot the following occurs: The contents of the Temporary Speaker register 102 is transferred to the Conference Speaker register 104 and the Temporary Speaker counter register 110 contents are transferred to the Conference Speaker counter register 111 by signal C-X. The Conferee register 101 and the Temporary register 102 are preset and the Conferee counter 109 is reset by signals C-Z. In the switching network of FIG. 2 the conference time slot receives a "null" code (since the conference is in group 2 which is the digital tone group) and sends out a "null" code since pulses HA and HB will be present. The network will now cycle through time slots 95, 96, 0, 1, etc. through J-1.

When time slot J occurs the following events transpire. The network will load the PCM information of conferee 1 into the Information memory 201 at address J. This will occur when pulse W is present. Control Memory A 202 is being read at this time and word J will be decoded to be 94 and the Conferee flip-flop 107 will be set. The Conferee counter 109 then advances to a count of 1 when pulse Y is present. The network will then load a "null" code or "quiet" into the Speaker A register 215 during time X and the PCM information for conferee No. 1 will be loaded into the Speaker B register 216 during time Y.

The Speaker B register 216 information will be loaded into the Conferee register 101 during times Z by signal CD Z. The network will then compare the Speaker A and Speaker B registers 215 and 216 respectively and choose the information located in the Speaker B register 216 (unless B is equal to "null" code) and attempt to output this information through the steering gate 219. The Force Conference-$\phi$ signal forces the Conference Speaker register 104 PCM information (this is the PCM information of the preceding frames speaker) through steering gate 105.

The contents of the Conferee register 101 is then compared to the contents of the Temporary Speaker register 102 and will be less, (i.e., A less than B) in binary value based on its greater PAM value. The contents of the Conferee register 101 will then be transferred to the Temporary Speaker register 102 and the Conferee counter 109 count, will be stored in the Temporary Speaker counter register 110. This occurs during the W time pulse of the next time slot since the CD (conference detect signal) goes from X time to X of the next time slot. The Conference Detected flip-flop 107 will reset at time pulse X. If, however, the pulse code modulation information of conferee No. 1 was "null" code no transfer occurs.

The switching network now counts through a time of L-1. When time slot L then occurs the following transpires: The network will load the PCM information of conferee N into the Information memory 201 at address L during time W. The Control Memory A 202 is available to the decode logic and the Conferee flip-flop 107 will set. The Conferee counter 109 will then advance during time Y and the network will load a "null" code into the Speaker A register 215 at time X with PCM information of Conferee N into the Speaker B register 216 during time Y.

The Speaker B register 216 information will then be loaded into the Conferee register 101 during time Z. The network then compares the Speaker A and Speaker B registers 215 and 216 respectively and chooses Speaker B register 216 (again, unless B equals "null" code) and tries to output it through the steering gate 219. The Force Conference-$\phi$ signal forces the Conference Speaker register 104 PCM information (of the preceding frame) through the steering gate 220.

The Conferee register 101 information is then compared to the Temporary Speaker register 102 information. If it is less in binary value (greater PAM) it will be updated and become the new Temporary Speaker information. The Conferee counter 109 information will also be transferred. If the information is not less in binary value, no transfer occurs. The transfer is the function of the ULSP (Update Loudest Speaker) signal which occurs during time W. The Conferee Detected flip-flop 107 then resets during time X.

The switching network will then continue to advance through time slot 93. For every conferee encountered an attempt will be made to update the information stored in the Temporary Speaker register. Note that during each time slot which a conferee is detected the previous frames conference PCM is forced through steering gate 220 and a determination is made to see if the Conferee is the speaker of the preceding frame. This is done by comparator 112 which compares the contents of the Conferee counter 109 to the Conference Speaker counter register 111. If they are both equal two events will occur, first the conference PCM information forced through the network steering gate 220 is then switched to "null" code in the conference steering gate 105. This is done so that the present speaker does not hear himself. Secondly gate 133 will output signal LASD-φ ("false" signal) to the A' input of comparator 103, this in effect places the incoming PCM sample to comparator 103, at the highest value of the corresponding curve segment. If the contents of the temporary speaker buffer register 102 is in the same companding curve segment, comparator 103 will output an "A < B" signal to gate 119 resulting in an ULSP signal to registers 102 and 110. The contents of register 101 will then be transferred to register 102 and the contents of counter 109 will be transferred to register 110. Since the contents of Temporary Speaker counter register 110 and conference speaker counter buffer register 111 are now identical, the conference speaker same comparator 130 will output a true signal to gate 132. A NSS-φ ("false" signal) will then exit from gate 132 to input B' of comparator 103. The NSS-φ signal is also inputted to gate 133 forcing it to remove signal LASD-φ to the A' input of comparator 103.

If the previous selected PCM sample for the speaker of the preceding frame was in the four highest segments ("false" signal on the highest order segment bit of the PCM sample), the preferred sense register 136 will output a PRF EN-φ ("false" signal) to enable gates 134 and 135. Gate 135 will output a "prefer preference" signal to input A" of comparator 103 during the presence of signal LASD-φ and gate 134 will output "prefer preference" to B" input of comparator 103 in response to the presence of signal NSS-φ.

Preference is removed when signal NSS-φ disappears, i.e., the identities of the present select and the previous select speakers are not matched as sensed by the Conference Speaker Same comparator 130.

The switching network now reaches time slot 94. At this time pulses C·W, C·W, C·Y and C·Z will sequentially occur. At pulse C·X the Temporary Speaker counter register 110 information becomes the Conference Speaker count for the following frame. The Temporary Speaker register 102 contents (PCM code of the selected conferee) are transferred to the Conference Speaker register 104 and the Temporary Speaker counter register 110 contents (the conference count number) are transferred to the Conference Speaker counter register 111. The Conference register 101 and Temporary Speaker register 102 are preset and the Conferee counter 109 is reset by signal C·Z. In the network the conference time slot 94 receives and sends the "null" code.

The above cycle continues as outlined above, searching for a new speaker for the following frame. If no conferees exist the Conferee counter 109 will not advance from reset. The Conference Detected flip-flop 107 will never set so that Force Conference-φ signal will remain high to the network. The Conferee register 101 and Temporary Speaker register 102 are preset to contain a "null" code.

If in a switching system like that shown in FIG. 2 the associated conference circuit such as shown in FIG. 1 is removed from the system (being a system option), a pull up resistor 252 on the force conference lead inhibits the conference PCM-φ bus from ever going "out". This assumes that the software of the switching system realizes the option is not equipped and will not set up conference network configurations. The present system includes the ability to put individual conferees on "hold" (inhibited from use of conference circuit) using the Control Memory A hold bit. This arrangement is included in the conference detection logic and will inhibit the Conference Detected flip-flop 107 from setting during this time slot.

While but a single embodiment of the present invention has been shown it will be obvious to those skilled in the art that numerous modifications may be made without departing from the spirit of the present invention which should be limited only by the scope of the claims appended hereto.

What is claimed is:

1. In a pulse code modulated communication system, a plurality of communication channels arranged on a multiplexed basis, a switching system including a memory access by said communication channels and a conference circuit including, a first register connected to said memory operated to store the coded value of information from each of said channels conducted sequentially through said memory, a second register connected to said first register and including an output circuit connection to said channels, a first comparator circuit connected to said first and to said second registers operated to compare the coded value of information stored in said first and said second registers and in response to determination that the value of information stored in said first register is less than the value of information stored in said second register to cause the coded value of information stored in said first register to be transferred to said second register for transfer of said coded value of information to said channels under control of said switching system, counting means connected to said memory periodically incremented in response to signals from said memory, a fourth register connected to said counting means operated to store the count of said counting means, a fifth register connected to said fourth register, said count stored in said fourth register transferred to said fifth register in response to signals from said switching system, and a second comparator circuit connected to said fourth and fifth registers and including a circuit connection to said channels, operated in response to determination that the count stored in said fourth and fifth registers are equal, to inhibit transfer information to said channels, the improvement comprising: a third comparator circuit connected to said fourth and fifth registers operated in response to determination that the count stored in said fourth and fifth registers are equal; a sixth register connected to said second register and to said switching system operated in response to a signal of at least a predetermined digital value stored in said second register; and gating means connected to said second comparator circuit, to said third comparator circuit, to said sixth register, and to said switching system, and including a plurality of output circuit connections to said first comparator circuit, selectively operated in response to said second and third comparator circuits and said sixth register to operate said first comparator circuit to modify the coded values of information stored in said first and said second registers.

2. In a pulse code modulated communication system as claimed in claim 1, wherein: said gating means comprise a plurality of gate circuits including a first gate circuit connected to said second comparator circuit and to said switching system, and including an output circuit connection to said first comparator circuit, operated in response to said second comparator circuit, to operate said first comparator circuit to modify the coded value of information stored in said first register.

3. In a pulse code modulated communication system as claimed in claim 1, wherein: said gating means comprise a plurality of gate circuits including a second gate circuit connected to said third comparator circuit, and to said switching system, and including an output circuit connection to said first comparator circuit, operated in response to said third comparator circuit, to operate said first comparator circuit to modify the coded value of information stored in said second register.

4. In a pulse code modulated communication system as claimed in claim 2, wherein: said gating means comprise a plurality of gates including a third gate connected to said sixth register and to said first gate circuit and including an output circuit connection to said first comparator circuit, operated in response to said sixth register and said first gate circuit, to operate said first comparator circuit to modify the coded value of information stored in said first register.

5. In a pulse code modulated communication system as claimed in claim 3, wherein: said gating means comprise a plurality of gate circuits including a fourth gate circuit connected to said sixth register and to said second gate circuit and including an output circuit connection to said first comparator circuit, operated in response to said sixth register and said second gate circuit, to operate said first comparator circuit to modify the coded value of information stored in said second register.

* * * * *